(12) United States Patent
Gadre et al.

(10) Patent No.: US 7,519,158 B2
(45) Date of Patent: Apr. 14, 2009

(54) PUMPING SCHEMES FOR X-RAY TUBES WITH FERROFLUID SEALS

(75) Inventors: Aniruddha Dattatraya Gadre, Rexford, NY (US); Darren Lee Hallman, Clifton Park, NY (US); John Scott Price, Niskayuna, NY (US); Paul M. Ratzmann, Germantown, WI (US); Richard Michael Roffers, Whitefish Bay, WI (US); Walter John Smith, Ballston Spa, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/609,842

(22) Filed: Dec. 12, 2006

(65) Prior Publication Data
US 2008/0137811 A1    Jun. 12, 2008

(51) Int. Cl.
*H01J 35/20* (2006.01)
*H01J 35/00* (2006.01)
(52) U.S. Cl. ..................... 378/123; 378/132
(58) Field of Classification Search ........... 378/119, 378/123, 131, 132, 133
See application file for complete search history.

(56) References Cited

U.S. PATENT DOCUMENTS

| 3,327,931 | A | | 6/1967 | Hall .......................... 417/49 |
| 4,577,340 | A | * | 3/1986 | Carlson et al. ............. 378/132 |
| 5,007,513 | A | * | 4/1991 | Carlson .................... 192/21.5 |
| 5,077,781 | A | * | 12/1991 | Iversen ...................... 378/200 |
| 5,340,122 | A | * | 8/1994 | Toboni et al. ............... 277/410 |
| 7,203,280 | B2 | * | 4/2007 | Anno et al. ................ 378/130 |

* cited by examiner

*Primary Examiner*—Irakli Kiknadze
(74) *Attorney, Agent, or Firm*—Jason K. Klindtworth

(57) ABSTRACT

A system for mitigating a gas load imposed upon a high vacuum chamber, thereby reducing the overall pressure, includes a device mounted onto a rotating gantry. The device has a first chamber enclosing a high vacuum and a first region in which anode bearings are positioned. A rotatable shaft has a first portion extending into the first chamber and a second portion extending into the first region. A ferrofluid seal is positioned about the rotatable shaft and positioned between the first portion and the second portion, the ferrofluid seal fluidically separating the first chamber from the first region. At least one pressure-reducing unit is fluidically connected to the first chamber.

20 Claims, 6 Drawing Sheets

PUMPING SCHEMES FOR X-RAY TUBES WITH FERROFLUID SEALS

BACKGROUND OF THE INVENTION

The present invention relates generally to x-ray tubes and, more particularly, to mitigating a gas load on an x-ray tube chamber having a shaft of an anode passing through a ferrofluid seal.

X-ray systems typically include an x-ray tube, a detector, and a bearing assembly to support the x-ray tube and the detector. In operation, an imaging table, on which an object is positioned, is located between the x-ray tube and the detector. The x-ray tube typically emits radiation, such as x-rays, toward the object. The radiation typically passes through the object on the imaging table and impinges on the detector. As radiation passes through the object, internal structures of the object cause spatial variances in the radiation received at the detector. The detector then emits data received, and the system translates the radiation variances into an image, which may be used to evaluate the internal structure of the object. One skilled in the art will recognize that the object may include, but is not limited to, a patient in a medical imaging procedure and an inanimate object as in, for instance, a package in a computed tomography (CT) package scanner or an inspection CT device.

X-ray tubes include a rotating anode structure for distributing the heat generated at a focal spot. The anode is typically rotated by an induction motor having a cylindrical rotor built into a cantilevered axle that supports a disc-shaped anode target and an iron stator structure with copper windings that surrounds an elongated neck of the x-ray tube. The rotor of the rotating anode assembly is driven by the stator. An x-ray tube cathode provides a focused electron beam that is accelerated across an anode-to-cathode vacuum gap and produces x-rays upon impact with the anode. Because of the high temperatures generated when the electron beam strikes the target, it is necessary to rotate the anode assembly at high rotational speed. This places stringent demands on the bearing assembly, which typically includes tool steel ball bearings and tool steel raceways positioned within the vacuum region, thereby requiring lubrication by a solid lubricant such as silver. In addition, the rotor, as well, is placed in the vacuum region of the x-ray tube. Wear of the lubrication and loss thereof from the bearing contact region increases acoustic noise and slows the rotor during operation. Placement of the bearing assembly in the vacuum region prevents lubricating with wet bearing lubricants, such as grease or oil, and performing maintenance on the bearing assembly to replace the solid lubricant.

In addition, the operating conditions of newer generation x-ray tubes have become increasingly aggressive in terms of stresses because of g forces imposed by higher gantry revolution speeds and higher anode rotational speeds. As a result, there is greater emphasis in finding bearing solutions for improved performance under the more stringent operating conditions. Placing the bearing assembly and rotor outside the vacuum region of the x-ray tube by use of a hermetic rotating seal, such as a ferrofluid seal, allows the use of conventional lubricants, such as grease or oil, to lubricate the bearing assembly. In addition, maintenance may be performed on the bearing assembly and rotor without interrupting the vacuum in the vacuum region.

A ferrofluid seal typically includes a series of annular regions between a rotating component and a non-rotating component. The annular regions are occupied by a ferrofluid that is typically a hydrocarbon-based or fluorocarbon-based oil with a suspension of magnetic particles therein. The particles are coated with a stabilizing agent, or surfactant, which prevents agglomeration of the particles in the presence of a magnetic field. When in the presence of a magnetic field, the ferrofluid is caused to form a seal within each of the annular regions. The seal within each annular region, or stage, can separately withstand pressure of typically 1-3 psi and, when each stage is placed in series, the overall assembly can withstand pressure varying from atmospheric pressure on one side to high vacuum on the other side.

The ferrofluid seal allows rotation of a shaft therein designed to deliver mechanical power from the rotor on one side of the seal to the anode on the other side. As such, the motor rotor may be placed outside the vacuum region to enable conventional grease-lubricated or oil-lubricated bearings to be placed as an anode support on the same side of the seal as the rotor. Furthermore, such bearings may be larger than those typically used on the vacuum side.

While ferrofluid seals hermetically seal one side from the other, gas and water vapor may diffuse through the ferrofluid and into the vacuum region, the rates of which are governed by diffusion mass transport. Ionizable gases that transport through the seal, when exposed to the high voltage environment of an x-ray tube, can lead to ionization failure of the x-ray tube. Likewise, a gas evaporated from the hydrocarbon-based or fluorocarbon-based oil used to make the ferrofluid that occupies the annular regions of the ferrofluid assembly may pass into the vacuum region, leading eventually to ionization failure of the x-ray tube.

Therefore, it would be desirable to design an apparatus to mitigate the ionizable gas load which either passes through a ferrofluid seal or is evaporated therefrom.

BRIEF DESCRIPTION OF THE INVENTION

The present invention provides an apparatus for mitigating an ionizable gas load on an x-ray tube that overcomes the aforementioned drawbacks. A pressure reducing device is fluidically coupled to a high vacuum region of the x-ray tube to mitigate the ionizable gas load therein that emits from or through the ferrofluid seal.

According to one aspect of the present invention, a system for mitigating a gas load imposed upon a high vacuum chamber, thereby reducing the overall pressure, includes a device mounted onto a rotating gantry, the device having a first chamber enclosing a high vacuum and a first region in which anode bearings are positioned. A rotatable shaft has a first portion extending into the first chamber and a second portion extending into the first region. A ferrofluid seal is positioned about the rotatable shaft and positioned between the first portion and the second portion, the ferrofluid seal fluidically separating the first chamber from the first region. At least one pressure-reducing unit is fluidically connected to the first chamber.

In accordance with another aspect of the present invention, an imaging system includes a rotatable mount and an x-ray tube mounted on the rotatable mount. The x-ray tube includes a vacuum enclosure having a high vacuum formed therein and a region containing rotatable bearing supports. A hermetic seal is positioned between the vacuum enclosure and the region, a rotatable shaft extends from within the vacuum enclosure and into the region through the hermetic seal, and a gas reduction unit is fluidically connected to the vacuum enclosure.

In accordance with yet another aspect of the present invention, a method of manufacturing an x-ray tube includes the steps of inserting a first portion of a rotatable shaft in a first volume and inserting a second portion of the rotatable shaft in a second volume. The method further includes attaching a ferrofluid seal assembly to the rotatable shaft between the first portion and the second portion to hermetically seal the first volume from the second volume, forming a vacuum in the first volume, and coupling a high-vacuum pressure-reducing device to the first volume.

Various other features and advantages of the present invention will be made apparent from the following detailed description and the drawing.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

The operating environment of the present invention is described with respect to the use of an x-ray tube as used in a computed tomography (CT) system. However, it will be appreciated by those skilled in the art that the present invention is equally applicable for use in other systems that require the use of an x-ray tube. Such uses include, but are not limited to, x-ray imaging systems (for medical and non-medical use), mammography imaging systems, and radiographic (RAD) systems.

Moreover, the present invention will be described with respect to use in an x-ray tube. However, one skilled in the art will further appreciate that the present invention is equally applicable for other systems that require operation of a high vacuum environment that experiences a degradation of performance due to the presence of ionizable gases, the systems of which that could benefit from a reduction of an ionizable gas load. The present invention will be described with respect to a "third generation" CT medical imaging scanner, but is equally applicable with other CT systems, such as a baggage scanner or a scanner for other non-destructive industrial uses.

Figure 1:
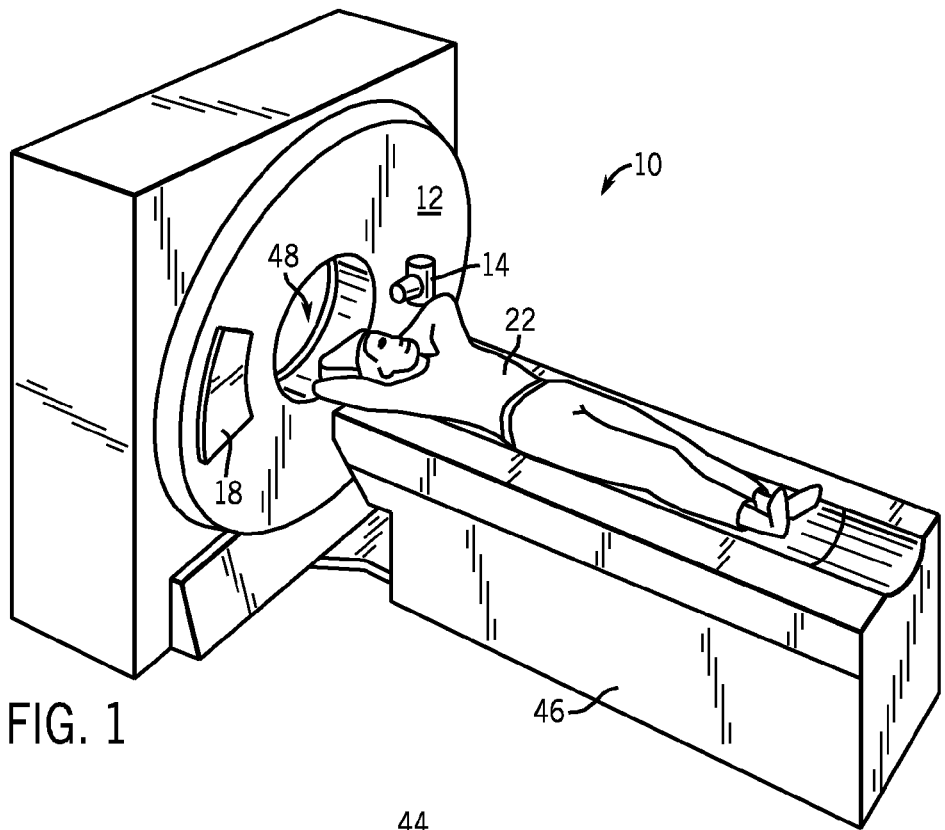
FIG. 1 is a pictorial view of a CT imaging system that can benefit from incorporation of an embodiment of the present invention.
Figure 2:
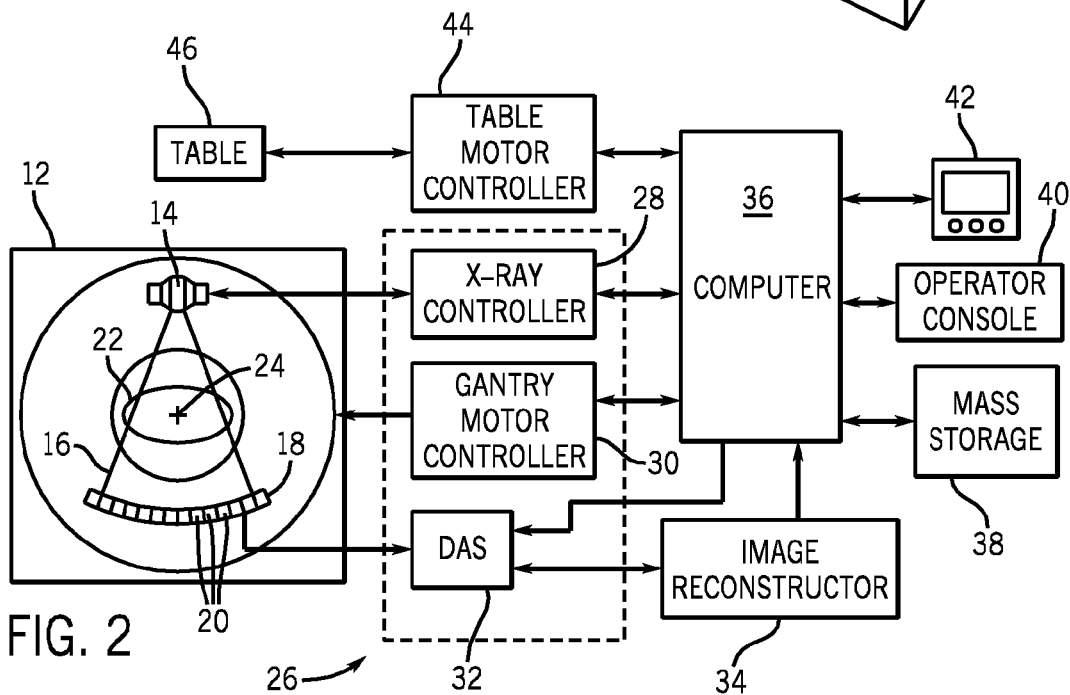
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray tube 14 that projects a beam of x-rays 16 toward a detector array 18 on the opposite side of the gantry 12. Detector array 18 is formed by a plurality of detectors 20 which together sense the projected x-rays that pass through a medical patient 22. Each detector 20 produces an electrical signal that represents the intensity of an impinging x-ray beam and hence the attenuated beam as it passes through the patient 22. During a scan to acquire x-ray projection data, gantry 12 and the components mounted thereon rotate about a center of rotation 24.

Rotation of gantry 12 and the operation of x-ray tube 14 are governed by a control mechanism 26 of CT system 10. Control mechanism 26 includes an x-ray controller 28 that provides power and timing signals to an x-ray tube 14 and a gantry motor controller 30 that controls the rotational speed and position of gantry 12. A data acquisition system (DAS) 32 in control mechanism 26 samples analog data from detectors 20 and converts the data to digital signals for subsequent processing. An image reconstructor 34 receives sampled and digitized x-ray data from DAS 32 and performs high speed reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 and gantry 12. Particularly, table 46 moves portions of patient 22 through a gantry opening 48.

Figure 3:
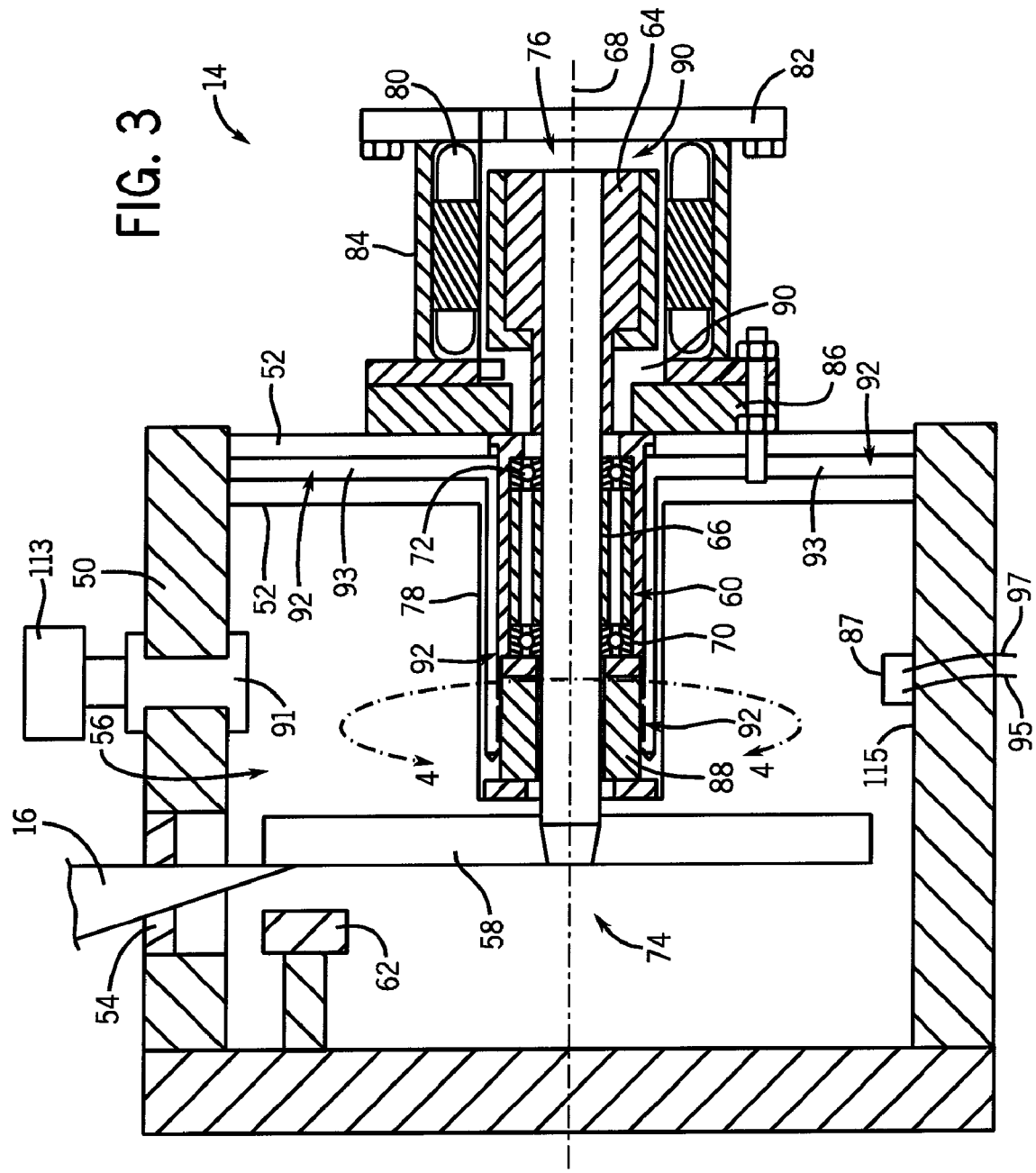
FIG. 3 illustrates a cross-sectional view of an x-ray tube that can benefit from incorporation of an embodiment of the present invention.

FIG. 3 illustrates a cross-sectional view of an x-ray tube 14 according to an embodiment of the present invention. The x-ray tube 14 includes a frame 50 and an anode backplate 52. A radiation emission passage 54 allows x-rays 16 to pass therethrough. Frame 50 and anode backplate 52 enclose an x-ray tube volume 56, which houses a target, or anode, 58, a bearing assembly 60, and a cathode 62. X-rays 16 are produced when high-speed electrons are suddenly decelerated when directed from the cathode 62 to the anode 58 via a potential difference therebetween of, for example, 60 thousand volts or more in the case of CT applications. The x-rays 16 are emitted through radiation emission passage 54 toward a detector array, such as detector array 18 of FIG. 2. To avoid overheating the anode 58 from the electrons, a rotor 64 and a center shaft 66 rotate the anode 58 at a high rate of speed about a centerline 68 at, for example, 90-250 Hz. Anode 58 is attached to center shaft 66 at a first end 74, and the rotor 64 is attached to center shaft 66 at a second end 76.

The bearing assembly 60 includes a front bearing 70 and a rear bearing 72, which support center shaft 66 to which anode 58 is attached. In a preferred embodiment, front and rear bearings 70, 72 are lubricated using grease or oil. Front and rear bearings 70, 72 are attached to center shaft 66 and are mounted in a stem 78, which is supported by anode backplate 52. A stator 80 rotationally drives rotor 64 attached to center shaft 66, which rotationally drives anode 58.

A mounting plate 82, a stator housing 84, a stator mount structure 86, stem 78, and a ferrofluid seal assembly 88 surround an antechamber 90 into which bearing assembly 60 and rotor 64 are positioned and into which the second end 76 of center shaft 66 extends. Center shaft 66 extends from antechamber 90, through ferrofluid seal assembly 88, and into x-ray tube volume 56. The ferrofluid seal assembly 88 hermetically seals x-ray tube volume 56 from antechamber 90. Cooling passage 92 carries coolant 93 through anode backplate 52 and into stem 78 to cool ferrofluid seal assembly 88 thermally connected to stem 78.

Figure 4:
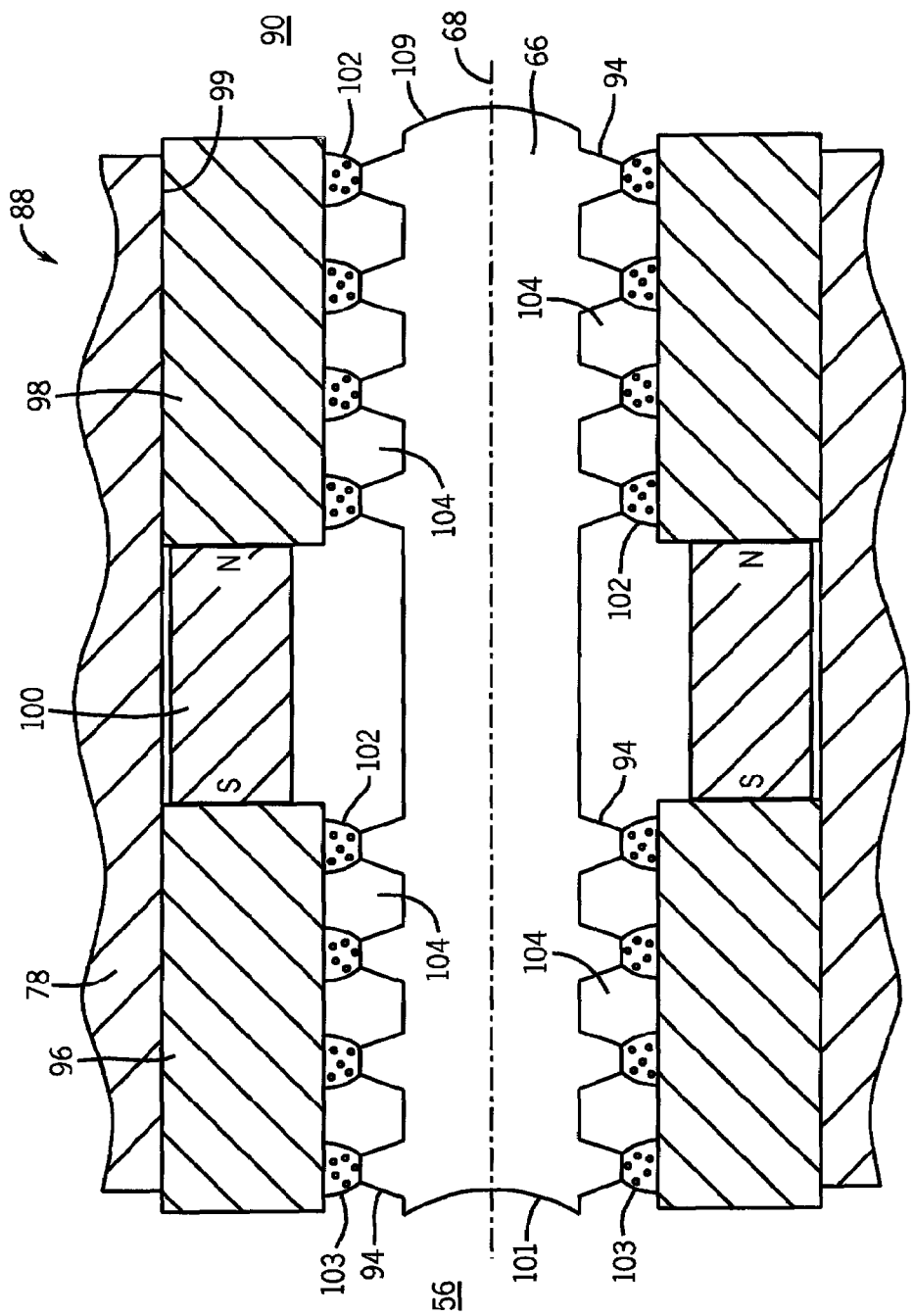
FIG. 4 illustrates a cross-sectional view of a ferrofluid seal assembly according to an embodiment of the present invention.

FIG. 4 illustrates a cross-sectional view of the ferrofluid seal assembly 88 of FIG. 3. A pair of annular pole pieces 96, 98 abut an interior surface 99 of stem 78 and encircle center shaft 66. An annular permanent magnet 100 is positioned between pole piece 96 and pole piece 98. In a preferred embodiment, center shaft 66 includes a annular rings 94 extending therefrom toward pole pieces 96, 98. Alternatively, however, pole pieces 96, 98 may include annular rings extending toward center shaft 66 instead of, or in addition to, annular rings 94 of center shaft 66. A ferrofluid 102 is positioned between each annular ring 94 and corresponding pole piece 96, 98, thereby forming cavities 104. Magnetization from permanent magnet 100 retains the ferrofluid 102 positioned between each annular ring 94 and corresponding pole piece 96, 98 in place. In this manner, multiple stages of ferrofluid 102 are formed that hermetically seal the pressure of gas in the antechamber 90 of FIG. 3 from a high vacuum formed in x-ray tube volume 56. As shown, FIG. 4 illustrates 8 stages of ferrofluid 102. Each stage of ferrofluid 102 withstands 1-3 psi of gas pressure during rotation of center shaft 66 about centerline 68. Accordingly, one skilled in the art will recognize that the number of stages of ferrofluid 102 may be increased or decreased, depending on the difference in pressure between the ends 101, 109 of the ferrofluid seal assembly.

Still referring to FIG. 4, an x-ray tube volume 56 is exposed to ferrofluid 102 at emission surfaces 103. Ferrofluid 102, comprising a hydrocarbon-based or fluorocarbon-based oil, evaporates, thus causing a gas load into x-ray tube volume 56 at emission surfaces 103. Furthermore, gases 89 originating in antechamber 90 will diffuse or otherwise pass through ferrofluid 102 stages and emit into x-ray tube volume 56, likewise, at emission surfaces 103.

Referring again to FIG. 3, gas or vapor that may leak or diffuse through the ferrofluid seal assembly 88 to x-ray tube volume 56 causes high-voltage instability of x-ray tube 14. The gas or vapor may include air, water vapor, hydrocarbons, inert gases, organic compounds, and the like According to an embodiment of the present invention, the gas load that passes, or diffuses, through ferrofluid seal assembly 88 and into x-ray tube volume 56 is mitigated by a pressure reducing unit, such as an ion pump placed within x-ray tube volume 56, a getter, or a turbomolecular pump attached to frame 50, each in fluidic contact with x-ray tube volume 56. Such pressure reducing units or devices may include, but are not limited to, a turbo-molecular pump, an ion pump, and a getter.

A turbomolecular pump uses a rapidly spinning turbine to remove gas from a region to create or maintain a high vacuum. A turbomolecular pump may have a single stage or may have of multiple stages. Gas captured in upper stages is moved into lower stages and exhausted to the surrounding ambient environment. Maximum compression ratio varies linearly with rotor speed, which may range typically from 20,000 to 50,000 revolutions per minute. The compression ratio typically varies exponentially with the square root of the molecular weight of the pumped gas, thus heavy molecules are more efficiently pumped than light molecules.

Referring to FIG. 3, a turbomolecular pump 113 may be attached to x-ray tube volume 56 by connection to port 91. However, a turbomolecular pump typically is not operated in a high g environment at, for instance, the mounting point of an x-ray tube on a CT gantry as shown in FIG. 1. Accordingly, a turbomolecular pump may be positioned within imaging system 10 at a position closer to the center of rotation 24 (shown in FIG. 2) than x-ray tube 14.

An ion pump is a device that can remove gas from a chamber without the use of moving parts. Typically, a high voltage strips electrons from the gas, thus generating positively charged ions. Positively charged ions are attracted to negatively charged electrodes in the ion pump and are thereby adsorbed onto a metal surface of the electrodes. A static B-field is supplied by a set of two permanent magnets, one on each side of a pumping chamber. The crossed E-field and B-field serve to maintain a high density of ionizing electrons and accelerate gas ions toward the collection surfaces.

An ion pump may be attached to an x-ray tube volume to mitigate gases which emit from, for instance, a ferrofluid assembly. An ion pump is typically made of materials that are vacuum-compatible and may be baked for purposes of cleaning and x-ray tube processing. Ion pumps have the benefit of operating with no moving parts, and require little electrical power to be delivered for operation within, for instance, an x-ray tube.

Referring to FIG. 3, alternatively or in addition to the turbomolecular pump described above, an ion pump 87 is attached to an inner surface 115 of x-ray tube volume 56. Ion pump leads 95, 97 may be fed through frame 50 to enable control of the ion pump 87 during operation of x-ray tube 14. As described above, ion pump 87 reduces ionizable gases emitting from ferrofluid 102 at emission surfaces 103 into x-ray tube volume 56.

Getters provide another option for pumping gas within an x-ray tube environment. A surface may provide useful pumping action when able adsorb gas molecules within, for instance, an x-ray tube. A getter is a material that is able to adsorb gas molecules on its surface in the form of a stable chemical compound. A clean surface of the getter may be obtained by either depositing the getter material in situ, or by positioning the getter material at the desired pumping location and heating the material to a temperature where first, the oxygen from the passivating layer diffuses from the surface into the bulk getter material, followed by the ongoing adsorption and indiffusion of the species to be pumped. There is no power requirement for operation of a getter. A getter is activated by typically a resistive heater or an inductance heater. Two main families of getters are evaporable and non-evaporable types.

Evaporable getters include activation of the getter material, typically barium or titanium, wherein a fresh layer of metal is released that acts to trap gas molecules incident thereon. The number of available sites for bonding approaches $10^{14}/cm^2$. The capacity of the evaporable getter is one to several monolayers and the total amount of gas held in an evaporable getter is dependent upon the temperature of the surface, the nature of the bond between the gas molecule and the getter material, and the cleanliness of the getter surface.

Non-evaporable getters are produced typically by fixing a powder to a substrate by pressing or sintering. After attachment to the surface, the getter is activated by heating using for instance a resistive heater or an inductive heater. A thin film getter surface may also be produced by, for instance, sputtering a getter to a substrate and activating the getter thereafter by heating.

Figure 5:
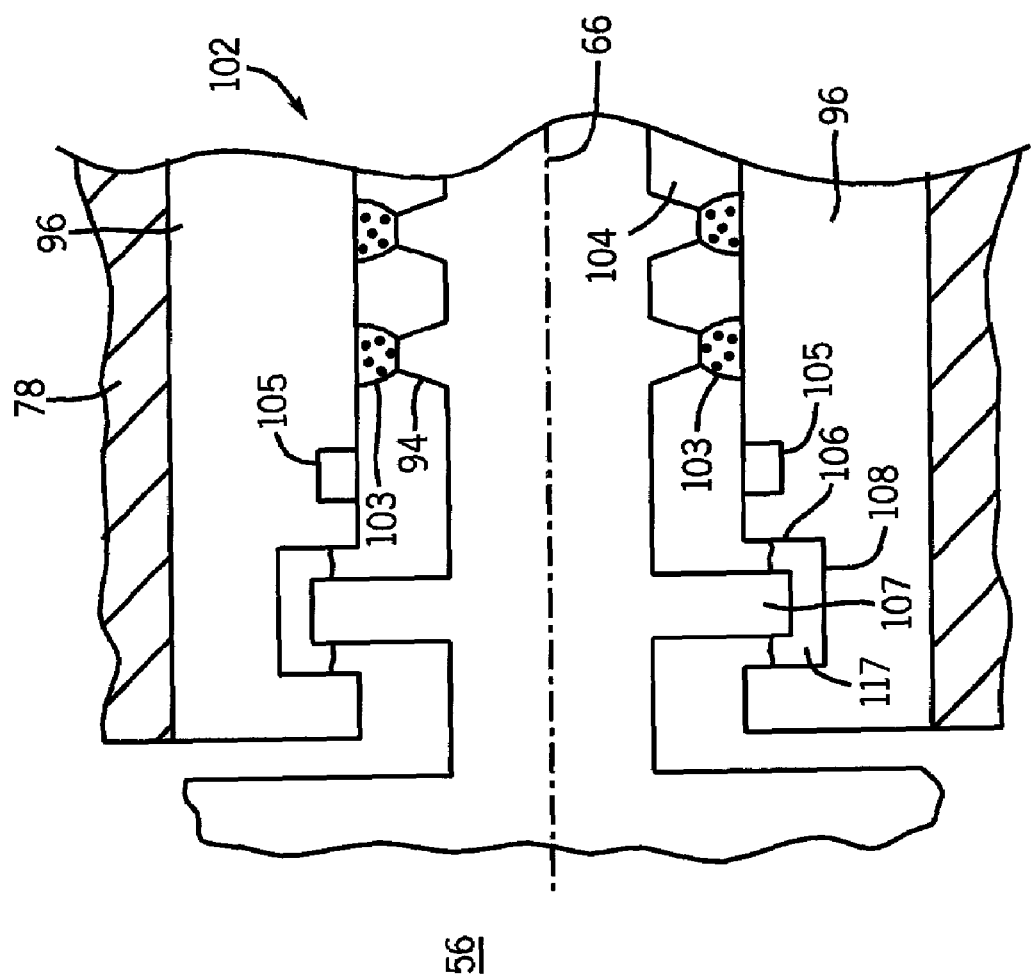
FIG. 5 illustrates a cross-sectional view of a pressure reducing device according to an embodiment of the present invention.
Figure 6:
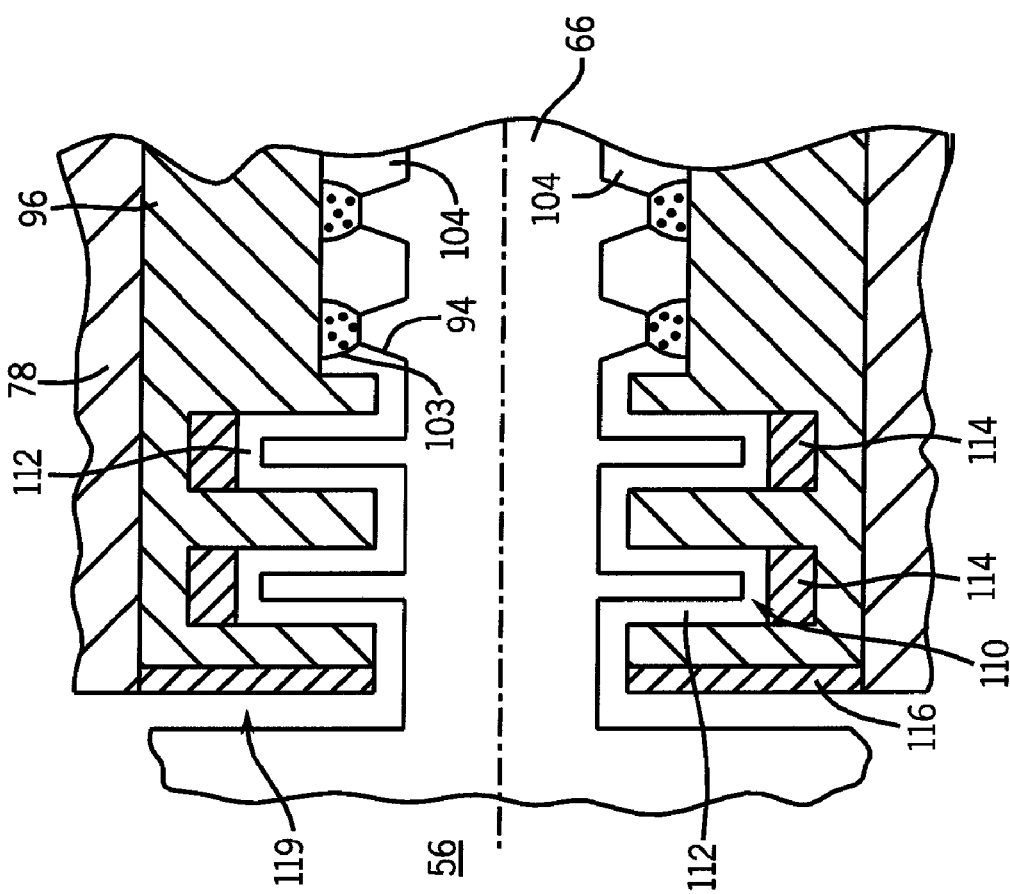
FIG. 6 illustrates a cross-sectional view of a pressure reducing device according to another embodiment of the present invention.

Embodiments of getters according to the present invention are illustrated in FIGS. 5 and 6. Because a getter does not require electrical leads attached thereto, a getter may be positioned in locations within x-ray tube 14 not available for, for instance, a turbomolecular pump or an ion pump. Accordingly, a getter may be positioned much nearer the gaseous source in order to intercept gases emitting from emission surfaces 103. Gases which pass through ferrofluid 102, or which evaporate therefrom at emission surfaces 103, may be intercepted by use of a getter positioned between ferrofluid seal assembly 88 and x-ray tube volume 56.

Referring now to FIG. 5, according to an embodiment of the present invention, an evaporative, non-evaporative, or thin-film getter 105 is positioned such that gases that pass through ferrofluid 102 or emit from emission surfaces 103 are intercepted before passing to x-ray tube volume 56. Accordingly, gases that pass getter 105 are adsorbed and retained thereon upon formation of a stable chemical compound with the getter material of getter 105.

A liquid pool 106 may provide a liquid diffusion barrier for gases which emit from emission surfaces 103 such that gases that pass getter 105 and are not adsorbed thereon encounter a diffusion obstacle prior to entering x-ray tube volume 56. A radial extension 107 extends from center shaft 66 extends into a cutaway 108 formed in pole piece 96. Liquid pool 106 comprises a liquid of, for instance, gallium metal that is disposed in a gap 117 formed between pole piece 96 and radial extension 107. Accordingly, liquid pool 106 may augment the operation of getter 105 by providing a diffusion barrier between emission surfaces 103 and x-ray tube volume 56 by use of a liquid metal having a low vapor pressure.

Referring now to FIG. 6, according to an embodiment of the present invention, a labyrinthine passage 110 is formed between center shaft 66 and pole piece 96. One or more radial extensions 111 extend from center shaft 66 and into one or more cutaways 112 formed in pole piece 96. Accordingly, gases which emit from emission surfaces 103 must pass through labyrinthine passage 110 before emerging in x-ray tube volume 56. Labyrinthine passage 110 may be, for instance, only 25-50 microns in clearance between the one or more radial extensions 111 and the one or more cutaways 112, thereby providing a tortuous, long and narrow path for gases to travel through upon emission from emission surfaces 103. An evaporative, non-evaporative, or thin-film getter 114 may be positioned in each cutaway 112 along the labyrinthine passage 110 such that getters 114 capture a portion of the gasses passing through labyrinthine passage 110. Alternatively or in addition to getters 114, an evaporative, non-evaporative, or thin-film getter 116 may be positioned near an end 119 of pole piece 96 to capture a portion of the gasses passing through labyrinthine passage 110.

One skilled in the art will recognize that the elements present in FIGS. 5 and 6 may be combined. For instance, a liquid pool could be provided in a design which includes a labyrinthine passage, wherein a getter may be placed along a tortuous path created between emission surfaces 103 and x-ray tube volume 56.

Figure 7:
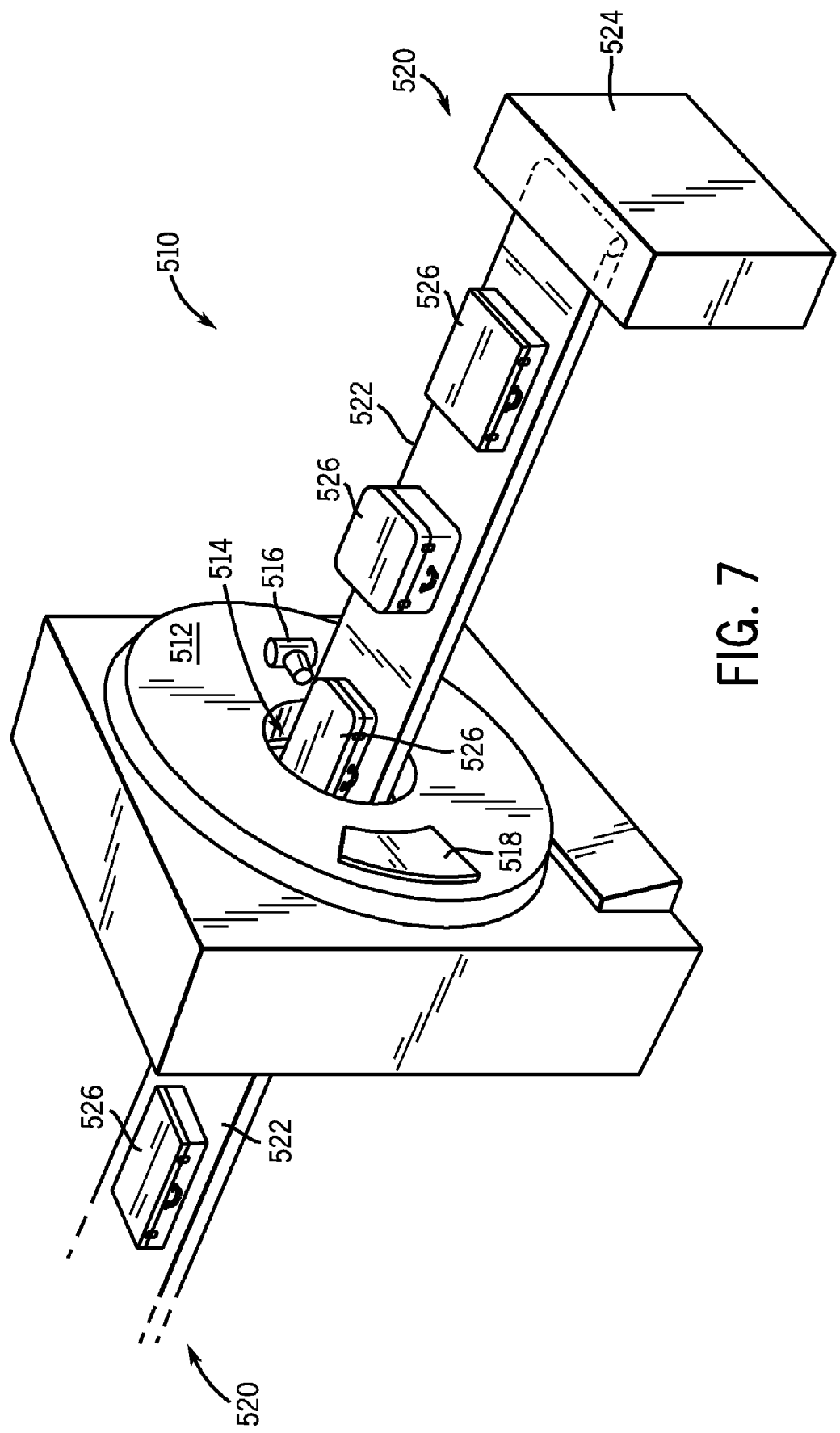
FIG. 7 is a pictorial view of a CT system for use with a non-invasive package inspection system.

FIG. 7 is a pictorial view of a CT system for use with a non-invasive package inspection system. Package/baggage inspection system 510 includes a rotatable gantry 512 having an opening 514 therein through which packages or pieces of baggage may pass. The rotatable gantry 512 houses a high frequency electromagnetic energy source 516 according to an embodiment of the present invention, as well as a detector assembly 518 having scintillator arrays comprised of scintillator cells. A conveyor system 520 is also provided and includes a conveyor belt 522 supported by structure 524 to automatically and continuously pass packages or baggage pieces 526 through opening 514 to be scanned. Objects 526 are fed through opening 514 by conveyor belt 522, imaging data is then acquired, and the conveyor belt 522 removes the packages 526 from opening 514 in a controlled and continuous manner. As a result, postal inspectors, baggage handlers, and other security personnel may non-invasively inspect the contents of packages 526 for explosives, knives, guns, contraband, etc. Additionally, such systems may be used in industrial applications for non-destructive evaluation of parts and assemblies.

Therefore, according to one embodiment of the present invention, a system for mitigating a gas load imposed upon a high vacuum chamber, thereby reducing the overall pressure, includes a device mounted onto a rotating gantry, the device having a first chamber enclosing a high vacuum and a first region in which anode bearings are positioned. A rotatable shaft has a first portion extending into the first chamber and a second portion extending into the first region. A ferrofluid seal is positioned about the rotatable shaft and positioned between the first portion and the second portion, the ferrofluid seal fluidically separating the first chamber from the first region. At least one pressure-reducing unit is fluidically connected to the first chamber.

In accordance with another embodiment of the present invention, an imaging system includes a rotatable mount and an x-ray tube mounted on the rotatable mount. The x-ray tube includes a vacuum enclosure having a high vacuum formed therein and a region containing rotatable bearing supports. A hermetic seal is positioned between the vacuum enclosure and the region, a rotatable shaft extends from within the vacuum enclosure and into the region through the hermetic seal, and a gas reduction unit is fluidically connected to the vacuum enclosure.

In accordance with yet another embodiment of the present invention, a method of manufacturing an x-ray tube includes the steps of inserting a first portion of a rotatable shaft in a first volume and inserting a second portion of the rotatable shaft in a second volume. The method further includes attaching a ferrofluid seal assembly to the rotatable shaft between the first portion and the second portion to hermetically seal the first volume from the second volume, forming a vacuum in the first volume, and coupling a high-vacuum pressure-reducing device to the first volume.

The present invention has been described in terms of the preferred embodiment, and it is recognized that equivalents, alternatives, and modifications, aside from those expressly stated, are possible and within the scope of the appending claims.

What is claimed is:

1. A system for mitigating a gas load imposed upon a high vacuum chamber, thereby reducing the overall pressure, comprising:
 a device mounted onto a rotating gantry, the device having a first chamber enclosing a high vacuum and a first region in which anode bearings are positioned;
 a rotatable shaft having a first portion extending into the first chamber and a second portion extending into the first region;
 a ferrofluid seal positioned about the rotatable shaft and positioned between the first portion and the second portion, the ferrofluid seal fluidically separating the first chamber from the first region;
 a labyrinthine passage positioned between the ferrofluid seal and the first chamber, and
 at least one pressure-reducing unit fluidically connected to the first chamber.

2. The system of claim 1 wherein the device is an x-ray tube.

3. The system of claim 1 wherein the at least one pressure-reducing unit is a getter positioned within the labyrinthine passage.

4. The system of claim 1 wherein the at least one pressure-reducing unit comprises a getter, an ion pump, and a turbo-molecular pump.

5. The system of claim 4 wherein the getter is one of an evaporable getter, a non-evaporable getter, and a thin-film getter coating positioned within the first chamber.

6. The system of claim 4 wherein the ion pump is positioned within the first chamber.

7. The system of claim 1 further comprising:
an x-ray tube target attached to the first portion of the rotatable shaft;
a rotor attached to the second portion of the rotatable shaft; and
a bearing assembly attached to the second portion of the rotatable shaft.

8. The system of claim 1 wherein the ferrofluid seal comprises:
a pole piece encircling the rotatable shaft;
a plurality of annular rings extending from one of the pole piece and the rotating shaft toward the other of the pole piece and the rotating shaft such that a plurality of gaps is formed between the plurality of annular rings and the other of the pole piece and the rotating shaft;
at least one magnet encircling the rotatable shaft and positioned such that the plurality of gaps is disposed in a magnetic field formed by the magnet; and
a ferrofluid deposited in the plurality of gaps.

9. The system of claim 1 wherein the rotating gantry is one of a CT gantry and a C-arm.

10. An imaging system comprising:
a rotatable mount; and
an x-ray tube mounted on the rotatable mount, the x-ray tube comprising:
a vacuum enclosure having a high vacuum formed therein;
a region containing rotatable bearing supports;
a hermetic seal positioned between the vacuum enclosure and the region;
a rotatable shaft extending from within the vacuum enclosure and into the region through the hermetic seal; and
a turbomolecular pump positioned at a rotational center of the gantry, and axially offset from a position of an object positioned within the gantry, wherein the turbomolecular pump is fluidically connected to the vacuum enclosure.

11. The imaging system of claim 10 wherein the getter is one of an evaporable getter, a non-evaporable getter, and a thin-film getter coating.

12. The imaging system of claim 10 wherein the hermetic seal is a ferrofluid seal.

13. The imaging system of claim 10 wherein the imaging system is one of a CT imaging system, a CT baggage scanner, and an x-ray imaging system.

14. The imaging system of claim 10 wherein the rotatable mount is one of a CT gantry and a x-ray system C-arm.

15. A method of manufacturing an x-ray tube comprising the steps of:
inserting a first portion of a rotatable shaft in a first volume;
inserting a second portion of the rotatable shaft in a second volume;
attaching a ferrofluid seal assembly to the rotatable shaft between the first portion and the second portion to hermetically seal the first volume from the second volume;
forming a vacuum in the first volume;
coupling a getter to the first volume; and
positioning the getter between the first volume and the ferrofluid seal assembly.

16. The method of claim 15 wherein the first volume is a volume having an anode and a cathode of an x-ray tube contained therein.

17. The method of claim 15 further comprising attaching the rotatable shaft, the ferrofluid seal assembly, and the getter to a rotatable gantry.

18. The method of claim 15 further comprising forming a liquid diffusion barrier between the first volume and the ferrofluid seal assembly.

19. The method of claim 18 comprising forming the liquid diffusion barrier from a liquid metal having a low vapor pressure.

20. The method of claim 18 comprising forming the liquid diffusion barrier from gallium metal.

* * * * *